(12) United States Patent
Tabb

(10) Patent No.: US 9,495,618 B1
(45) Date of Patent: Nov. 15, 2016

(54) OBJECT DETECTION WITH TEXTURAL TO SPECTRAL DOMAIN ADAPTATION

(71) Applicant: DIGITALGLOBE, INC., Longmont, CO (US)

(72) Inventor: Mark D. Tabb, Estes Park, CO (US)

(73) Assignee: DigitalGlobe, Inc., Longmont, CO (US)

(*) Notice: Subject to any disclaimer, the term of this patent is extended or adjusted under 35 U.S.C. 154(b) by 0 days.

(21) Appl. No.: 14/819,839

(22) Filed: Aug. 6, 2015

(51) Int. Cl.
*G06K 9/00* (2006.01)
*G06K 9/46* (2006.01)
*G06K 9/62* (2006.01)
*G06K 9/66* (2006.01)
*G06T 7/40* (2006.01)

(52) U.S. Cl.
CPC .............. *G06K 9/6269* (2013.01); *G06K 9/46* (2013.01); *G06K 9/6202* (2013.01); *G06K 9/6223* (2013.01); *G06K 9/66* (2013.01); *G06T 7/40* (2013.01); *G06T 2207/10036* (2013.01)

(58) Field of Classification Search
CPC .................. G01N 24/081; G06K 2009/00644; G06K 9/0063; G06K 9/00637; G06K 9/00651; G06K 9/00657; G06T 2207/10032; G06T 2207/10036; G06T 2207/10041; G06T 2207/10044; G06T 2207/10048; G06T 2207/30181; G06T 2207/30184

See application file for complete search history.

(56) References Cited

U.S. PATENT DOCUMENTS

| | | | |
|---|---|---|---|
| 8,649,607 B1 * | 2/2014 | Hayat | G06K 9/6289 382/159 |
| 2010/0208951 A1 * | 8/2010 | Williams | G06K 9/2018 382/117 |
| 2014/0293091 A1 * | 10/2014 | Rhoads | G01J 3/513 348/234 |
| 2015/0036874 A1 * | 2/2015 | Gueguen | G06K 9/6219 382/103 |

* cited by examiner

*Primary Examiner* — Avinash Yentrapati
(74) *Attorney, Agent, or Firm* — Robert G. Crouch; Marsh Fischmann & Breyfogle LLP

(57) ABSTRACT

Techniques for object detection include training a first classifier to detect an object based on textural features and a second classifier to detect the object based on textural features and spectral features. A classifier relationship between the two classifiers is learned and used with the first classifier to detect other objects. If desired, the performance of the object detector can be improved by comparing the results of detecting objects with the first classifier and the classifier relationship versus detecting objects with the first and second classifier together, and modifying the classifier relationship based upon the comparison.

20 Claims, 7 Drawing Sheets

OBJECT DETECTION WITH TEXTURAL TO SPECTRAL DOMAIN ADAPTATION

BACKGROUND

High resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like.

In the case of a consumer digital camera, for instance, an image sensor is generally arranged in an area array (e.g., 3,000 rows of 3,000 pixels each, or 9,000,000 total pixels) which collects the image area in a single "snapshot." However, satellite-based imaging often functions on the "push-broom scanning" principle whereby each image sensor includes a relatively small number of rows (e.g., a couple) of a great number of pixels (e.g., 50,000) in each row. Each row of pixels is scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of satellite images varies depending on factors such as the particular instrumentation utilized, the altitude of the satellite's orbit, and the like.

To allow for the extraction of additional information from the radiance received at a satellite after being reflected from the Earth's surface (which may include atmospheric effects such as from aerosols, clouds, etc.), multi-spectral imaging may be employed. Specifically, multi-spectral imaging captures image data at specific frequencies or wavelengths across the electromagnetic spectrum, including those in the visible light range as well as those beyond or outside of the visible light range (e.g., near infrared (NIR), short wave infrared (SWIR), far infrared (FIR), etc.). For instance, a satellite may have one image sensor (e.g., radiometer) that is sensitive to wavelengths (e.g., high resolution data) across only a first spectral band (e.g., the visible light band, 0.38-0.75 μm) in addition to one or more additional image sensors that are sensitive to wavelengths only across other spectral bands (e.g., NIR, 0.75-1.4 μm; SWIR, 1.4-3 μm; etc.).

It is against this background that the techniques disclosed herein have been developed.

SUMMARY

Disclosed herein is a method for object detection in remotely-sensed images. The method includes identifying a first domain within a remotely-sensed image, wherein the first domain comprises textural features and spectral features; training a first classifier to detect a first object within the image based on a textural relationship between the textural features within the first domain; and training a second classifier to detect the first object based on: the textural relationships within the first domain; and a spectral relationship between the spectral features within the first domain. The method further includes learning a classifier relationship between the trained first classifier and the trained second classifier; training an object detector to detect at least one object based on the learned classifier relationship in the first domain; detecting the at least one object within a second domain using the trained object detector, wherein the second domain comprises textural and spectral features; comparing the detection of the at least one object in the first domain to the detection of the at least one object detected in the second domain; modifying the object detector based on the comparison between the detection of the at least one object in the first domain and the detection of the at least one object in the second domain; and detecting one or more objects in an additional domain with the modified optimal fast object detector.

The method may further include adapting the spectral features of the additional domain to correspond with the spectral features of the first domain and second domain. Learning the classifier relationship between the trained first classifier and the trained second classifier may include establishing a textural activation potential for the first classifier corresponding to at least one object; establishing a spectral activation potential for the second classifier corresponding to at least one object; and learning a relationship between the first classifier and the second classifier based on the established textural activation potential and the established spectral activation potential.

The first domain may include a first spectral dataset and the second domain comprises a second spectral dataset, wherein the first spectral dataset is different from the second spectral dataset. The modified object detector may use linear classification. Detecting one or more objects within the additional domain using the modified object detector may be performed in constant time using locality sensitive hashing structures. The spectral features may be divided into spectral ratio features and individual spectral band features. The remotely-sensed image may be a multispectral image. The first classifier may be a linear classifier. The second classifier may be a linear classifier.

The method may further include establishing a subset of training images having objects labeled by the first and second classifiers; and using the labeled training images for spectral adaptation. The method may further include performing a secondary optimization process after training the optimal fast object detector to improve object detection. A gradient orientation origin angle may be specified for the textural features. The method may further include assigning weighted values to textural features and spectral features using off-line codebooks followed by a max-pooling operation. Assigning weighted values may include using k-means clustering and a fixed codebook size. The method may further include performing a linear support-vector-machine classification after the max-pooling operation.

Also disclosed is a method for object detection in remotely-sensed images. The method includes learning a textural relationship between textural features within a strip of remotely-sensed images; labeling a first subset of remotely-sensed images based on the learned textural relationship to create spectral adaptation data; spectrally adapting a second subset of remotely-sensed images based on the spectral adaptation data; training a classifier to detect objects based a joint relationship between spectral features and the textural features within the spectrally adapted second subset of remotely-sensed images; determining an optimal adaptation module which agrees with the joint relationship; spectrally adapting the strip of remotely-sensed images with the optimal adaptation module; and training an object detector to detect at least one object in the spectrally adapted strip of remotely-sensed images.

Determining the optimal adaptation module may include defining a parametric set of transformations for mapping spectral information.

Also disclosed is a method for object detection in remotely-sensed images. The method includes identifying a first domain within a remotely-sensed image, wherein the first domain comprises textural features and spectral features; learning a textural relationship between the textural features within the first domain; training a first classifier to detect a first object based on the learned textural relationships between the textural features within the first domain; learning a joint relationship between the textural features and the spectral features within the first domain for the first object; training a second classifier to detect the first object based on the learned textural relationship and the learned joint relationship; and learning a classifier relationship between the trained first classifier and the trained second classifier, wherein learning the classifier relationship includes: establishing a textural activation potential for the first classifier corresponding to at least one object; establishing a spectral activation potential for the second classifier corresponding to at least one object; and learning a relationship between the first classifier and the second classifier based on the established textural activation potential and the established spectral activation potential. The method also includes training an object detector to detect at least one object based on the learned classifier relationship; performing a secondary optimization process to optimize the fast object detector; and detecting the at least one object within the second domain using the optimal fast object detector.

The optimization process may include establishing pooling centers to incrementally improve object detection.

In addition to the exemplary aspects and embodiments described above, further aspects and embodiments will become apparent by reference to the drawings and by study of the following descriptions.

DETAILED DESCRIPTION

Figure 1:
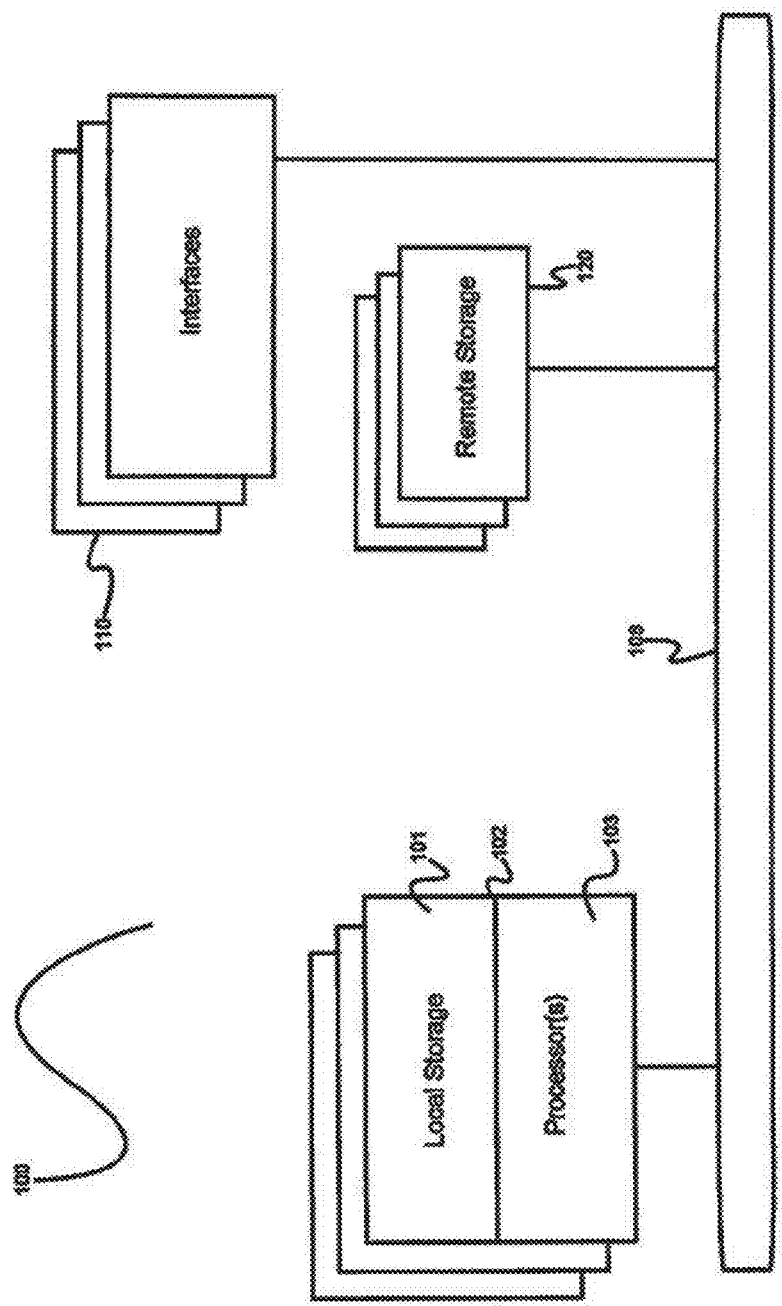
FIG. 1 is a block diagram illustrating an exemplary hardware architecture of a computing device used in an embodiment of the disclosure herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Domain adaptation is relevant to both classification and object recognition. Whenever an object detector or pixel level classifier is trained in one part of a remotely sensed image and then evaluated in another part, the performance is invariably very good. However, when such detectors are applied to other images, performance degrades, often severely. Radiometric differences due to solar and atmospheric effects are one cause, and can be compensated somewhat by calibration to surface reflectance, which is a simple form of domain adaptation. Unfortunately, the problem is considerably more difficult due to Bidirectional Reflectance Distribution Function effects (BRDF, a four-dimensional function that defines how light is reflected at an opaque surface), and the material properties themselves having both spatial and temporal variability. Consider the problem of detecting buildings. One area may have predominately gray asphalt roofs, another area red clay tiles, etc. One solution to this problem is to ignore the spectral information and use textual information only, based on local arrangements of edges or regions. Dense Scale-Invariant Feature Transform (Dense SIFT), Histogram of Oriented Gradients (HOG), and the like are some examples of textural descriptors. This approach has been used with our built-up extraction layer using region properties obtained from morphological decompositions. However, this ignores the huge amount of information contained in the multispectral bands. This amount of information will only increase as SWIR data becomes available with the WORLDVIEW-3 satellite (WV-3) and others in the future. For the building example, we can classify buildings at the 80-85% level using spectral information alone, provided that the classifier is evaluated on areas similar to where it was trained. However, our main adaptation approach, surface reflectance calibration, is less than optimal in that it only addresses a subset of the domain adaptation problem.

Described herein is an object detection approach which uses results from textural-based detectors to locally adapt both the spectral information as well as the spectral classifier itself, in order to obtain an optimal joint textural+spectral classifier. This approach does not require surface reflectance calibration, but performing such calibration may yield some benefit. Central to the use of linear classifiers, which allow for fast and simple classifier training and adaptation. Recently, a number of papers have shown that a more complicated nonlinear classifier (decision forest, RBF SVM, etc.) can be avoided if the feature space is first transformed using a sparse code (SC) representation from a codebook and then followed by spatial max-pooling operations. An advantage of linear classifiers is that the identification of multiple (even 100K) object-types can be performed in constant time using locality sensitive hashing (LSH) structures. Such approaches primarily have been applied to panchromatic images, but below we show how to use them with multiple spectral bands with domain adaptation.

Using the standard notation of representing object/class labels by Y, and the input feature space as X, we seek to train a detector which maximizes the discriminant $E(Y|X)$. Classic domain adaptation approaches assume that the statistics of X change between images, and seek to transform X in the evaluation image to the X in the training image. Oftentimes, the classifier itself is unchanged by this process. Surface reflectance calibration is one such example. Other approaches utilize incremental learning, and interpolate between the two spaces using, for example, Grassmann manifolds, and retrain the classifier on the fly to operate on the entire manifold. Performance of such methods can be variable, as the retraining is not related to any specific detection information in the evaluation image. Instead, we learn a relationship between textural features only and textural+spectral features, which we expect to hold across domains. We then find the best adaptation which agrees with this learned relationship.

Divide the feature space into textural features ($X_t$), spectral ratio features ($X_{sr}$), and individual spectral bands ($X_s$), i.e., $X = X_t \cup X_{sr} \cup X_s$. Spectral ratios are defined using band differences, i.e., (B1−B2)/(B1+B2) is the spectral ratio between image bands one and two. For a given object (Y), we train two classifiers: $E(Y|X_t)$ and $E(Y|X_t \cup X_{sr})$. The first classifier follows the philosophy adopted successfully by the computer vision field of (mostly) ignoring the spectral information. It should be noted that, while this obviously throws away a lot of information, it also works reasonably well, as the textural information typically varies much more slowly across domains than does the spectral. As an example, buildings are characterized by a well-defined range of sizes/shapes, with a much larger set of spectral signatures. The second classifier can be expected to yield better performance, and is trained on domain adapted data. In this case, (a subset of) the training images are labeled, and this information is used to perform a spectral adaptation.

A parametric set of transformations is defined for mapping the spectral information between images. At its simplest, this can be a gain and bias per channel for an entire image strip, but more variables for fitting spline or piecewise linear curves per channel can be added. In addition, such parameters can be placed on a sparse rectangular grid throughout the strip, with smooth interpolation between grid points. Using labeled training data, simple least squares provides the adaptation solution. Note that this adjustment can be performed using all labeled object classes over a scene, as they have the same spectral adaptation.

Next, we learn a relationship between the two classifiers. As the final stage of each classifier is linear, the output is an activation potential which is optimally thresholded. Let the unthresholded output of the first classifier be $y_t$, and the second classifier $y_{tsr}$. For binary classification (1 vs. all), the potentials are typically normalized during training to be in the range [−1, +1] corresponding to non-detection/detection, respectively, with a decision threshold of 0. From the training data, we learn a conditional likelihood $P(Y_{tsr}|Y_t)$ for each texture output potential. In general, a strong correlation should exist in the responses between the two detectors, with the combined classifier having higher mean absolute activation and providing better discrimination. The conditional likelihoods capture this relationship, which we expect to hold in aggregate across domains. In a test image, the number of constraints (activation potentials from all computed windows for all classes), vastly exceeds the set of adaptation parameters, so the conditional likelihoods need only hold in aggregate. Denoting the adaptation parameters on X by $\theta$, and the estimated classifier potentials by $y'_t$ and $y'_{tsr}$, the adaptation can be formulated as an optimization problem of finding the set of parameters which minimizes the Kullback-Leibler (KL) divergence between the estimated and expected conditional likelihoods:

$$\arg\min_\theta \Sigma_j \Sigma_i w(Y'_{t,i,j})^* KL\{P(Y_{tsr,j}|Y'_{t,i,j}), Y'_{tsr,i,j}(\theta)\} - \log p(\theta)$$

where KL{ } represents the symmetric KL divergence. The summation is computed over all classes (j) at each window (i) in the test image, with the detection done in standard sliding window fashion. W is a vector of weights learned for each texture activation potential value from the training/validation data. The off-line learning of W relates optimization of this functional to actual improvement in classification performance. This learning can also include a sparsity penalty term (|W|) in order to minimize the number of nonzero elements in W. We expect that the largest and smallest activation responses convey the most information, with those in the middle reflecting more uncertainty. A regularization prior on $\theta$ is given by $p(\theta)$. This term enforces spatial smoothness when a rectangular grid of parameters is used, and also controls the desired degree of adaptation. For example, if the data is first calibrated to surface reflectance, then the prior should penalize larger adaptations than if pixel values of Digital Numbers (DNs) are adapted. In order to make the optimization function differentiable, the max-pooling stage of the classification can be replaced by a logistic softmax. Standard nonlinear solvers such as Levenberg-Marquardt, with an LDL or Cholesky decomposition at each iteration, can be used. Note that a sparse number of labeled examples may be available for the test image. This may be due to some classes being available in public sources such as OpenStreetMap, or due to a limited amount of crowd sourcing being performed on the image. If present, we assume such data sources are sparse and incomplete, but the examples can be readily added into our optimization functional using a standard hinge loss metric.

So far, we have avoided direct use of the spectral bands, as these are the most sensitive to domain variations. We now seek to adapt the classifier to directly incorporate these measurements. We create a codebook for each evaluation image by first applying the parametric domain adaptation, and then using k-means clustering on the image bands to identify a predetermined number of clusters. We sparsely code each spectral observation using this codebook. As no training data is used in creating this classifier, we must severely restrict the number of free parameters. Because the classifiers are linear, the output potentials sum, and we solve for a blended combination of the textural and spectral ratio classifier with a spectral classifier:

$$y = \alpha^* y_s + (1-\alpha)^* y_{tsr}$$

where $\alpha$ is a blending parameter. Classifier parameters are denoted with a vector, $\beta$, and potentials are obtained with a simple dot product:

$$y = \beta^T x = a^* \alpha^* \beta^T_s x_s + (1-a^* \alpha)^* (\beta^T_{sr} x_{sr} + \beta^T_t x_t)$$

where $\beta_s$ are the spectral parameters which must be estimated. This is accomplished by minimizing a similar objective functional over ($\alpha$, $\beta_s$), except $p(\alpha, \beta_s)$ contains a sparsity term on $\beta_s$ to prevent it from having more than 1-3 nonzero elements, and $P(Y|Y'_{tsr})$ is used in place of $P(Y_{tsr}|Y'_t)$. The conditional likelihood $P(Y|Y'_{tsr})$ is computed during training using the estimated response, $Y'_{tsr}$, on the training data and not $Y_{tsr}$. The parameter $\alpha$ is restricted to the [0, 1] interval and is learned off-line to ensure that the classifier adaptation procedure on average improves performance. Returning to our building example, the classifier adaptation attempts to add to the final classifier 1-3 spectral colors that tend to reinforce strong absolute responses that occur in the adapted textural+spectral ratio classifier.

Figure 4:
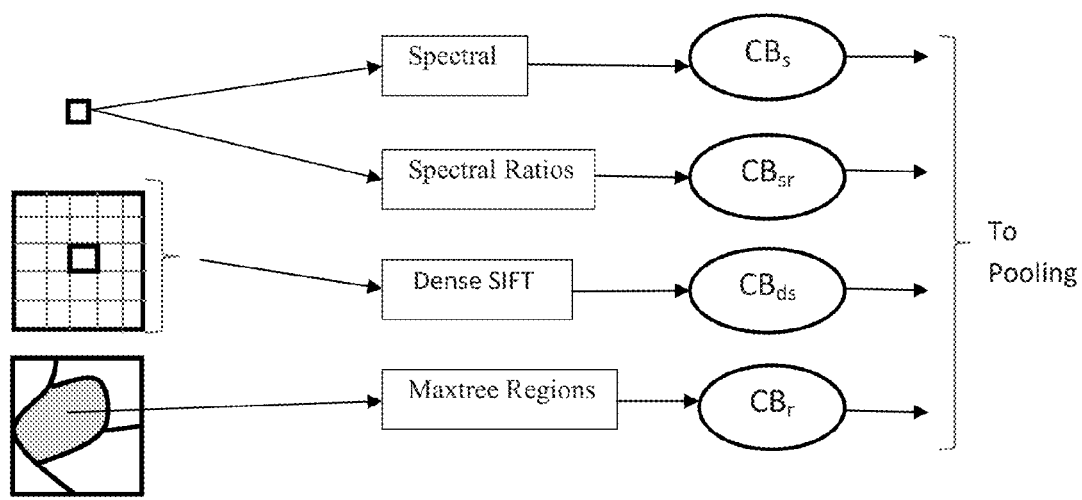
FIG. 4 is an illustration of a feature encoding process.

We utilize a standard sliding window detection approach, with two stages in order to minimize evaluation time. Response from the first stage must be sufficiently high in order for the second stage to be evaluated. Many existing approaches incrementally boost a strong classifier from a large collection of weak ones, and require extensive training as a result. In contrast, we use a fixed set of strong features, an initially fixed set of pooling centers, and a linear classifier. This makes for a fast and user interactive training process. Once an initial training has been completed, we can then perform a secondary optimization to adjust both the number and position of the pooling centers, similar to deformable part models, to incrementally improve the classification. FIG. 4 shows the basic feature extraction and encoding process. Pixel, local edge, and region level information is densely extracted at each pixel, and then sparsely encoded using predefined codebooks (CB). These sparsely encoded features are then pooled together by the different pooling regions. Finally, a linear Support Vector Machine (SVM) classification is performed on the pooled codewords.

Textural features are both edge-based (Dense SIFT) as well as region-based (max tree decomposition). These features are computed on the panchromatic channel, one of the MS bands, and for WV-3, one of the SWIR bands as well. Another possibility for the MS and SWIR bands is to compute the features using a band max approach. For example, at a given pixel, this could include selecting the maximum gradient value over all bands. Such an approach is not gain invariant across bands, and its performance would need to be evaluated. Spectral features include the individual bands as well as spectral ratios. It is overkill to choose all possible bands pairs, and a power of two discrete difference pyramid suffices. For example, for eight bands one can use the spectral ratios between the following bands pairs: (1-2, 2-3, 3-4, 4-5, 5-6, 6-7, 1-3, 3-6, 6-8, 1-5, 4-8, 1-8).

Off-line codebooks are created for each feature type, using k-means clustering and a fixed codebook size. Similar to sparse coding, the feature vectors are not assigned to a single codeword, but to a weighted sum of a small, predetermined (e.g., 3-5) number of words. A nearest neighbor lookup is done to find the nearest N codewords to a feature vector, and a Gaussian distance weighting from the vector to each codeword is computed: $w_i = \exp(-d_i/2\sigma_i^2)$, with $\sigma_i$ representing the isotropic variance of the ith codeword, and $d_i$ the Euclidean distance of the codeword to the feature vector. These weights are then normalized to sum to 1. The set of pooling regions 'pool' together the codebook weights lying within each of their bounding areas. Max-pooling, i.e., taking the maximum weight for each codebook value, typically outperforms histogram (average) approaches. The pooled weights from each pooling region are concatenated into a single vector as needed, and a linear SVM classification is performed.

It may be desirable to create a detector which is invariant to a 2-D rotation of the image, as most images have nearly nadir viewing geometry. For the spectral features, our pooling regions are centered directly over each pixel. However, for textural features, we use multiple pooling centers, and the feature extraction itself requires the gradient orientation origin angle to be specified.

Figure 5:
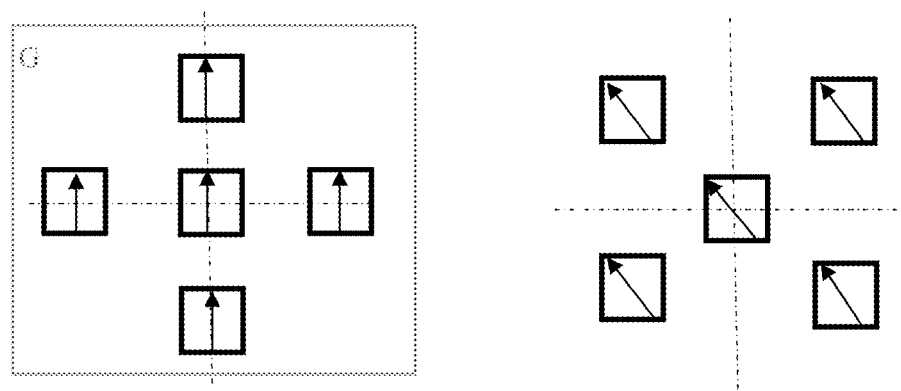
FIG. 5 is an illustration of rotational invariance within five pooling windows.

Consider a set of P pooling centers, with set relative offsets from the pixel being evaluated by the detector. Define a larger window, G, where gradients are histogrammed, and the angular bin with the largest histogram value is selected as the primary orientation (16 angular bins are used). For the P windows, we internally store 2N angular bins to provide proper Nyquist (2×) oversampling. All P windows are tied to the primary direction from G, so only 1 degree of freedom is lost over all windows in achieving rotation invariance. G is used to rotate the configuration to primary direction up. This causes two things: 1) The pooling centers shift position, and 2) their internal orientation needs to be rotated. We use an Integral Image on G, which allows each window to be computed in O(1) time, not O(W*H) for a W×H window. Internal orientation is rotated by shifting the resulting histogram by a fixed number of bins as determined from G. This is also an O(1) operation. See FIG. 5 which shows rotational invariance with 5 pooling windows, and a gradient orientation window (G). The base configuration is depicted in the drawing on the left. Given a primary orientation from G, the window's positions are rotated, and their internal representation is also shifted by the appropriate number of bins, as shown in the drawing on the right.

Figure 6:
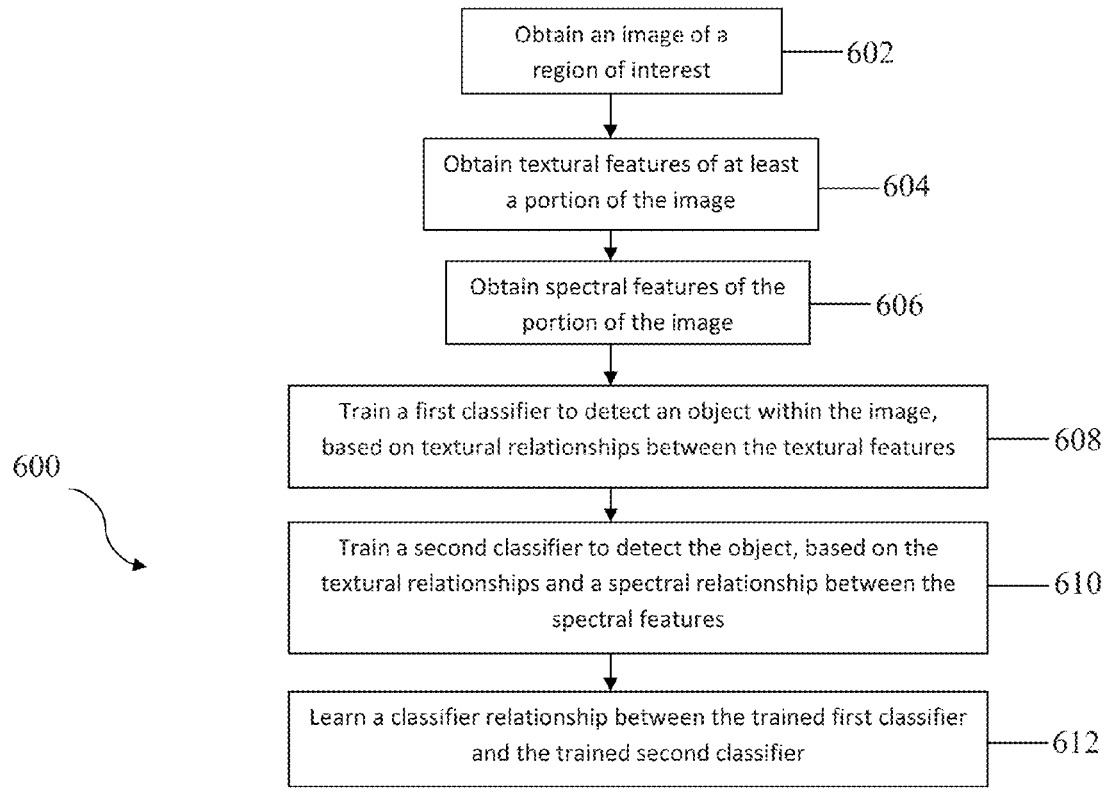
FIG. 6 is a flowchart of aspects of algorithms disclosed herein.

One aspect of the overall algorithm (training a pair of classifiers and learning a relationship between the classifiers) is shown in FIG. 6 that includes a flowchart 600. An image of a region of interest is obtained (602). Textural features of at least a portion of the image is obtained (604). Spectral features of the portion of the image are obtained (606). A first classifier is trained (608) to detect an object within the image, based on textural relationships between the textural features. A second classifier is trained (610) to detect the object, based on the textural relationships and a spectral relationship between the spectral features. A relationship is learned (612) between the trained first classifier and the trained second classifier.

Figure 7:
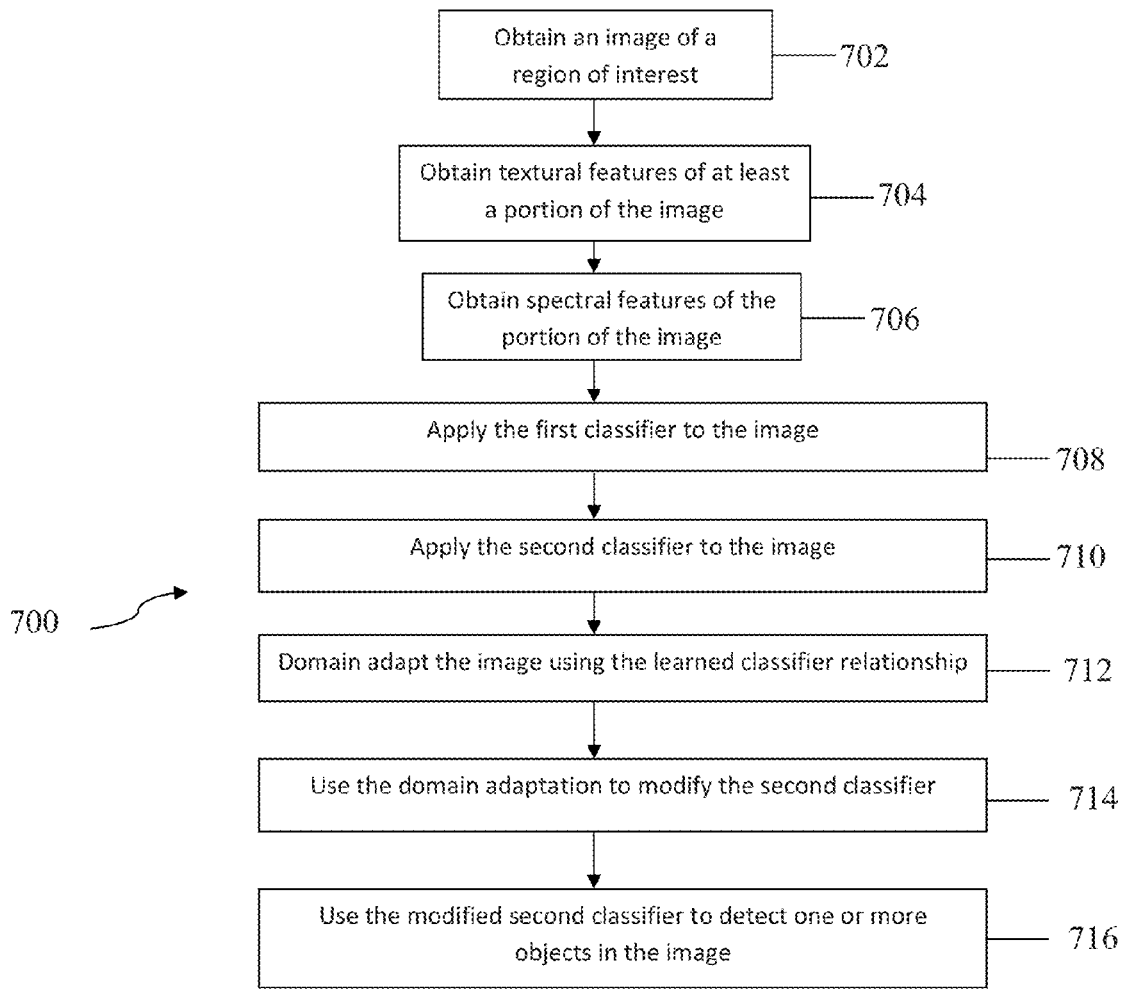
FIG. 7 is a flowchart with further aspects of algorithms disclosed herein.

A second aspect of the overall algorithm (domain adapting an image using the two classifiers and the relationship and then detecting objects in the image) is shown in FIG. 7 that includes a flowchart 700. As can be seen, each of the classifiers and the learned classifier relationship are used in detecting the object in additional images. An image of a region of interest is obtained (702). Textural features of at least a portion of the image are obtained (704). Spectral features of the portion of the image are obtained (706). The first classifier is then applied (708) to the image. The second classifier is then applied (710) to the image. The image is then domain adapted using the learned classifier relationship (712). This adaptation is then used (714) to modify the output of the second classifier. The modified second classifier is then used (716) to detect one or more objects in the image.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 2:
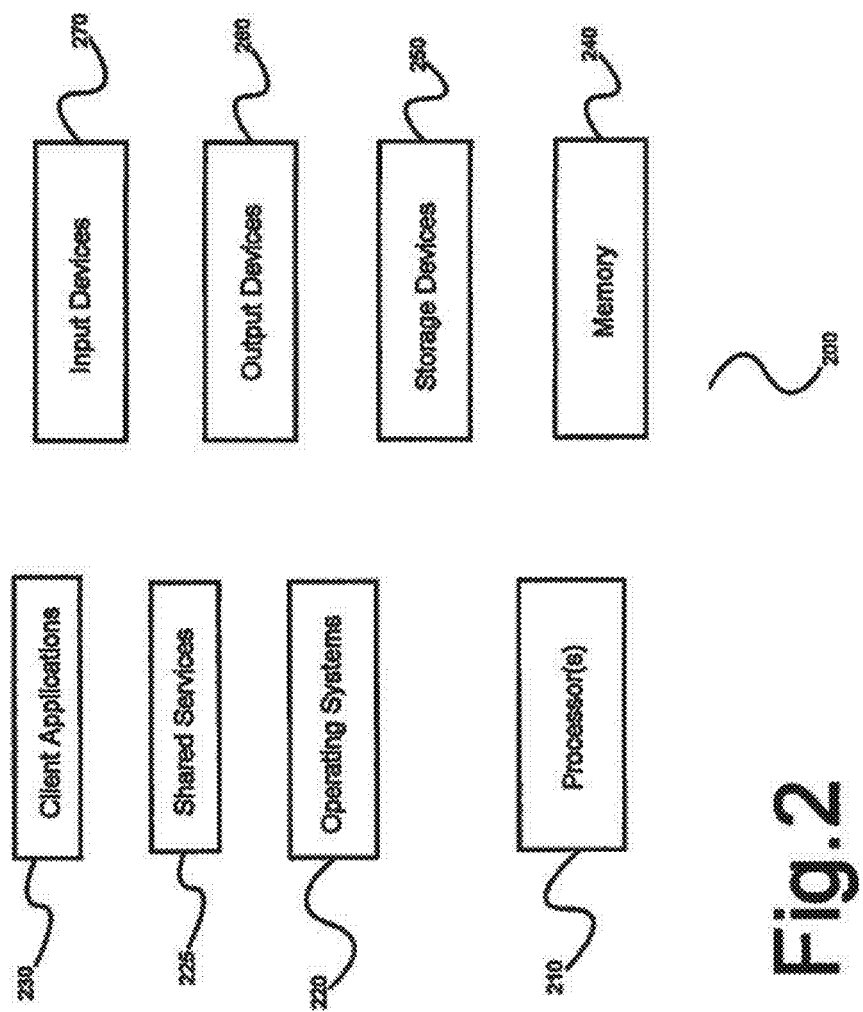
FIG. 2 is a block diagram illustrating an exemplary logical architecture for a client device, according to an embodiment of the disclosure herein.

Referring now to FIG. 2, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 2 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
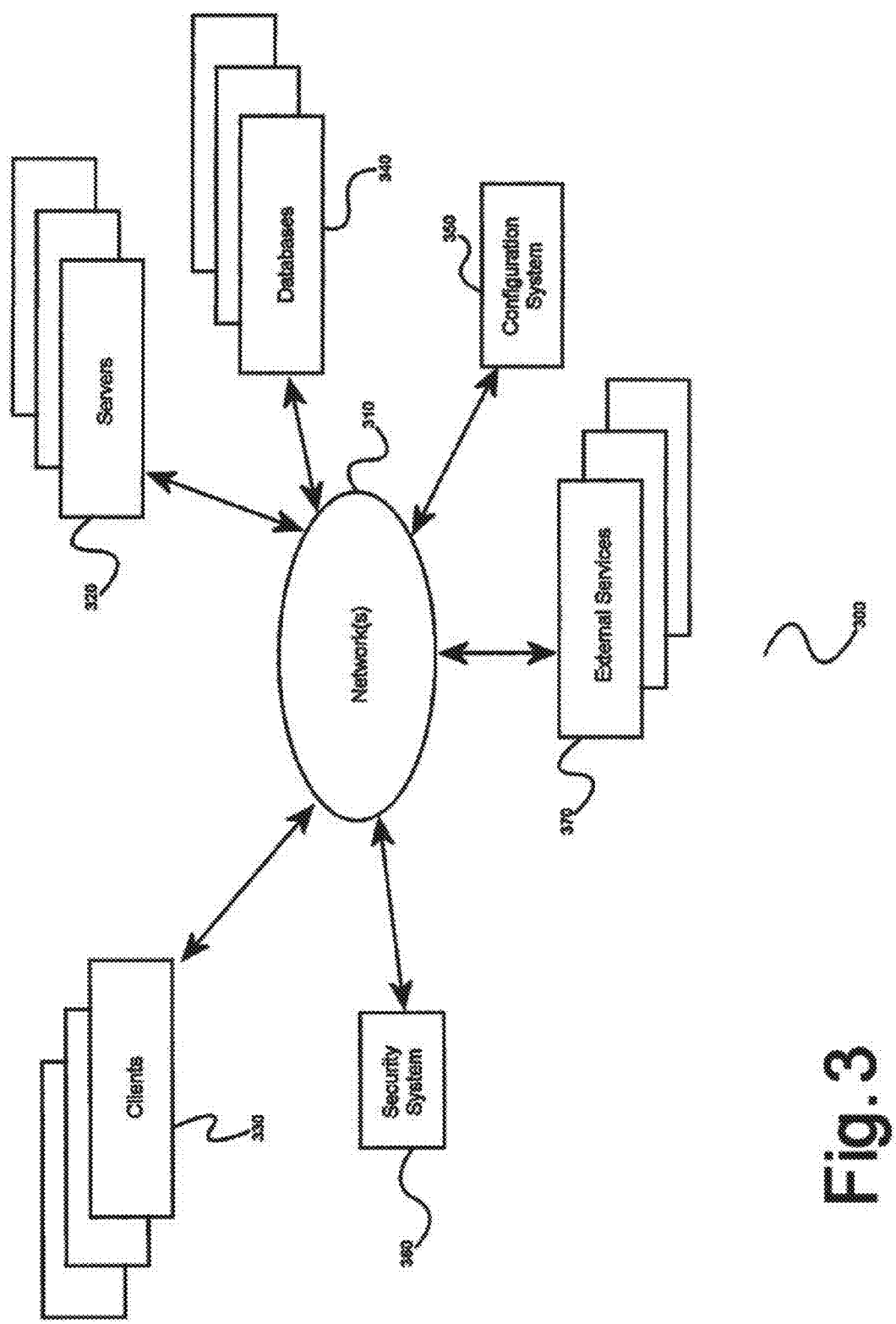
FIG. 3 is a block diagram illustrating an exemplary architectural arrangement of clients, servers, and external services, according to an embodiment of the disclosure herein.

In some embodiments, systems may be implemented on a standalone computing system. Referring now to FIG. 3, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

In some embodiments, systems may be implemented on a distributed computing network, such as one having any number of clients and/or servers. Referring now to FIG. 4, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 3. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A method for object detection in remotely-sensed images, the method comprising:
    identifying a first domain within a remotely-sensed image, wherein the first domain comprises textural features and spectral features;
    training a first classifier to detect a first object within the image based on a textural relationship between the textural features within the first domain;
    training a second classifier to detect the first object based on:
        the textural relationships within the first domain; and
        a spectral relationship between the spectral features within the first domain;
    learning a classifier relationship between the trained first classifier and the trained second classifier;
    training an object detector to detect at least one object based on the learned classifier relationship in the first domain;
    detecting the at least one object within a second domain using the trained object detector, wherein the second domain comprises textural and spectral features;
    comparing the detection of the at least one object in the first domain to the detection of the at least one object detected in the second domain;
    modifying the object detector based on the comparison between the detection of the at least one object in the first domain and the detection of the at least one object in the second domain; and
    detecting one or more objects in an additional domain with the modified optimal fast object detector.

2. The method of claim 1, further including adapting the spectral features of the additional domain to correspond with the spectral features of the first domain and second domain.

3. The method of claim 1, wherein learning the classifier relationship between the trained first classifier and the trained second classifier comprises:
    establishing a textural activation potential for the first classifier corresponding to at least one object;
    establishing a spectral activation potential for the second classifier corresponding to at least one object; and
    learning a relationship between the first classifier and the second classifier based on the established textural activation potential and the established spectral activation potential.

4. The method of claim 1, wherein the first domain comprises a first spectral dataset and the second domain comprises a second spectral dataset, wherein the first spectral dataset is different from the second spectral dataset.

5. The method of claim 1, wherein the modified object detector uses linear classification.

6. The method of claim 1, wherein detecting one or more objects within the additional domain using the modified object detector is performed in constant time using locality sensitive hashing structures.

7. The method of claim 1, wherein the spectral features are divided into spectral ratio features and individual spectral band features.

8. The method of claim 1, wherein the remotely-sensed image is a multispectral image.

9. The method of claim 1, wherein the first classifier is a linear classifier.

10. The method of claim 1, wherein the second classifier is a linear classifier.

11. The method of claim 1, further including establishing a subset of training images having objects labeled by the first and second classifiers; and using the labeled training images for spectral adaptation.

12. The method of claim 1, further including performing a secondary optimization process after training the optimal fast object detector to improve object detection.

13. The method of claim 1, wherein a gradient orientation origin angle is specified for the textural features.

14. The method of claim 1, further including assigning weighted values to textural features and spectral features using off-line codebooks followed by a max-pooling operation.

15. The method of claim 14, wherein assigning weighted values comprises using k-means clustering and a fixed codebook size.

16. The method of claim 14, further including performing a linear support-vector-machine classification after the max-pooling operation.

17. A method for object detection in remotely-sensed images, the method comprising:
    learning a textural relationship between textural features within a strip of remotely-sensed images;

labeling a first subset of remotely-sensed images based on the learned textural relationship to create spectral adaptation data;

spectrally adapting a second subset of remotely-sensed images based on the spectral adaptation data;

training a classifier to detect objects based a joint relationship between spectral features and the textural features within the spectrally adapted second subset of remotely-sensed images;

determining an optimal adaptation module which agrees with the joint relationship;

spectrally adapting the strip of remotely-sensed images with the optimal adaptation module; and training an object detector to detect at least one object in the spectrally adapted strip of remotely-sensed images.

18. The method of claim 17, wherein determining the optimal adaptation module comprises defining a parametric set of transformations for mapping spectral information.

19. A method for object detection in remotely-sensed images, the method comprising:

identifying a first domain within a remotely-sensed image, wherein the first domain comprises textural features and spectral features;

learning a textural relationship between the textural features within the first domain;

training a first classifier to detect a first object based on the learned textural relationships between the textural features within the first domain;

learning a joint relationship between the textural features and the spectral features within the first domain for the first object;

training a second classifier to detect the first object based on the learned textural relationship and the learned joint relationship;

learning a classifier relationship between the trained first classifier and the trained second classifier, wherein learning the classifier relationship includes:
  establishing a textural activation potential for the first classifier corresponding to at least one object;
  establishing a spectral activation potential for the second classifier corresponding to at least one object; and
  learning a relationship between the first classifier and the second classifier based on the established textural activation potential and the established spectral activation potential;

training an object detector to detect at least one object based on the learned classifier relationship;

performing a secondary optimization process to optimize the fast object detector; and detecting the at least one object within the second domain using the optimal fast object detector.

20. The method of claim 19, wherein the optimization process comprises establishing pooling centers to incrementally improve object detection.

* * * * *